United States Patent [19]

Lescher

[11] Patent Number: 5,307,536
[45] Date of Patent: May 3, 1994

[54] WINDSHIELD WIPER ARM
[75] Inventor: Henri Lescher, St. Germain-en-Laye, France
[73] Assignee: Paul Journee S.A., Colombes Cedex, France
[21] Appl. No.: 809,521
[22] PCT Filed: May 23, 1991
[86] PCT No.: PCT/FR91/00414
  § 371 Date: Jan. 20, 1992
  § 102(e) Date: Jan. 20, 1992
[87] PCT Pub. No.: WO91/17909
  PCT Pub. Date: Nov. 28, 1991
[30] Foreign Application Priority Data
  May 23, 1990 [FR] France .................. 90 06468
[51] Int. Cl.$^5$ ................................. B60S 1/38
[52] U.S. Cl. .................. 15/250.42; 15/250.36; 15/245
[58] Field of Search ......... 15/250.36, 250.35, 250.41, 15/250.42, 250.03, 245, 250.31

[56] References Cited
U.S. PATENT DOCUMENTS 2,011,015  8/1935  Schleicher ............... 15/250.41
3,048,872  8/1962  Kerrigan ............... 15/250.36
3,099,031  7/1963  Ludwig ............... 15/250.42
3,545,028  12/1970  Poland ............... 15/250.36
4,123,817  11/1978  Hartery ............... 15/250.36

FOREIGN PATENT DOCUMENTS 480599   8/1948  Belgium .
0240897  3/1987  European Pat. Off. .
2951688  12/1979 Fed. Rep. of Germany .
3611098  4/1986  Fed. Rep. of Germany .
2354904  6/1976  France .
171643   8/1986  Japan ............... 15/250.36
7409913  1/1976  Netherlands ............... 15/250.36
707559   4/1954  United Kingdom ............ 15/250.36
2004458  4/1979  United Kingdom ............ 15/250.36
90/08677 8/1990  World Int. Prop. O. .

Primary Examiner—Harvey C. Hornsby
Assistant Examiner—Gary K. Graham
Attorney, Agent, or Firm—Morgan & Finnegan

[57] ABSTRACT

The invention proposes a windshield wiper arm of the kind comprising a wiping strip (12) for the glass and a structure acting as a wiping strip support, which is connected to the free end of a driving arm and which comprises a profiled member (10) in a single piece, to which the driving arm is coupled and which receives the wiping strip (12) directly.

10 Claims, 1 Drawing Sheet

WINDSHIELD WIPER ARM

BACKGROUND OF THE INVENTION

The present invention is concerned with a windshield wiper arm for a motor vehicle.

A windshield wiper arm essentially consists of a rubber wiping strip which is connected to a driving arm through a structure which serves as a support, and the main function of which is to ensure the best possible wiping action by giving the wiping strip a spatial configuration which is always adapted to the curvature of the glass to be wiped and to the conditions in which it is to be used.

To this end, the known support structures comprise a rigid, metallic, main arm which is fixed to the free end of the driving arm, together with one or more arms which are articulated together and/or to the main arm, and some of which carry the wiping strip, while the latter may include reinforcing inserts which give it predetermined mechanical properties of transverse stiffness and/or longitudinal flexibility.

The assembly is thus very complex, and necessitates assembly operations, usually by crimping, which are lengthy and costly, with the quality of these operations having a direct influence on the performance and good operation of the windshield wiper.

By way of example, a windshield wiper arm operating over a length of 60 centimeters generally comprises a dozen components.

In addition, this design of windshield wiper arm has the effect of making each model that is produced different from the others, in terms of either the nature and dimensions of their components or of their number and method of assembly. As a result, large stocks have to be carried by the manufacturers, and it is impossible to rationalise mass production.

In order to reduce manufacturing costs, which are also due to the operations required to protect the product against corrosion, and operations of painting metallic components, it has been proposed to make these components out of plastics material, but the appearance of such an assembly is thought unfavourable to its commercial exploitation because customers see it as being a product of inferior quality.

SUMMARY OF THE INVENTION

An object of the invention is to propose a new design of windshield wiper arm which enables all these problems to be overcome.

To this end, the invention proposes a windshield wiper characterised in that the structure constituting a support for the wiping strip comprises a profiled member in one piece, to which the driving arm is connected and which directly receives the wiping strip which in turn includes a hollow coupling portion integral with the wiping strip and extending over substantially the whole length of the wiping strip, with the profiled member being received in the coupling portion.

In accordance with further features of the invention:
- the hollow coupling portion has a substantially U-shaped transverse cross section, the parallel branches of which enclose the corresponding faces of the profiled member;
- the profiled member has a substantially U-shaped transverse cross section, and is received in the hollow portion in such a way as to define an internal chamber having a substantially rectangular cross section;
- the parallel branches of the hollow coupling portion are substantially parallel to the general plane in which the wiping strip extends;
- the arm includes means for inter-engagement of the hollow coupling portion with the profiled member;
- the inter-engagement means comprise complementary series of projecting longitudinal ribs which are formed on the inner faces of the parallel branches of the hollow coupling portion, together with complementary longitudinal grooves formed on the corresponding opposed faces of the profiled member;
- the wiping strip is joined to the hollow coupling portion through an intermediate portion in the form of a bellows, the folds of which extend longitudinally;
- the internal chamber may be filled with a resiliently deformable material, and especially with expanded polyurethane foam;
- the profiled member and the wiping strip are portions of products made in continuous lengths;
- the wiping strip is a portion of a product of extruded rubber, while the profiled member is a portion of a product of extruded plastics material; and
- the piece constituting the profiled member undergoes a forming step in a mould prior to its assembly with the portion constituting the wiping strip.

BRIEF DESCRIPTION OF THE DRAWINGS

Further features and advantages of the invention will appear on a reading of the detailed description that follows, for the understanding of which reference will be made to the annexed drawings, in which.

DETAILED DESCRIPTION OF THE PREFERRED EMBODIMENT

Figure 1:
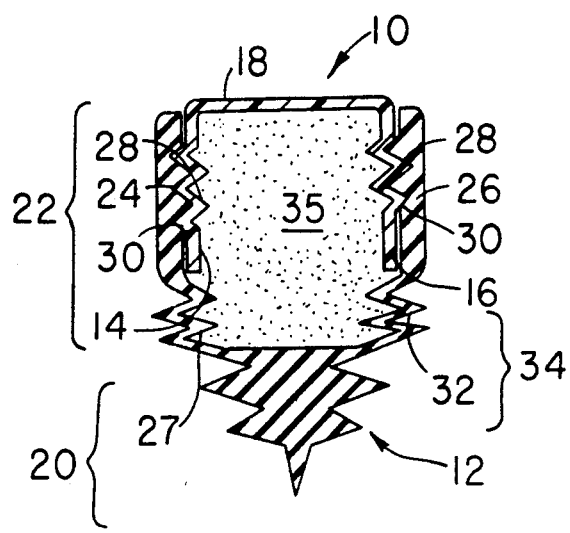
FIG. 1 is a view in transverse cross section taken on the line 1—1 in FIG. 2, of a windshield wiper arm in accordance with the invention.
Figure 2:
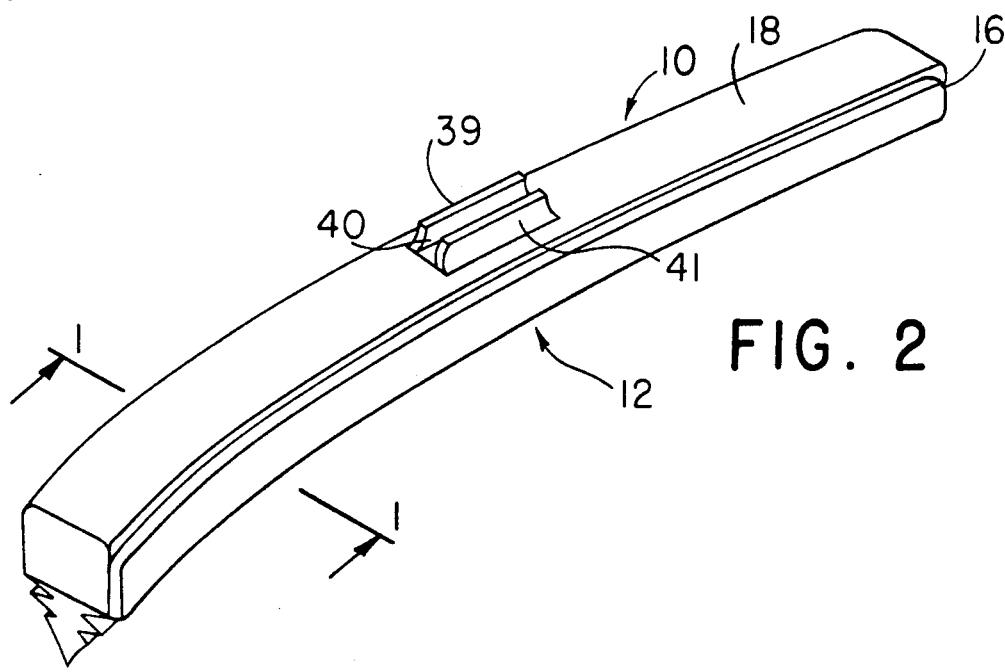
FIG. 2 is a perspective view of a windshield wiper arm in accordance with the invention.

There is shown in FIGS. 1 and 2 a windshield wiper arm comprising two components which are resiliently fitted one within the other, comprising a profiled member 10 and a wiping strip 12.

The profiled member 10 is a portion of a length of profiled, extruded plastics material, and the wiping strip 12 is a portion of an extruded rubber product.

In transverse cross section, the profiled member 10 serves to support the wiping strip 12, and has the shape of an inverted U comprising two parallel vertical branches 14 and 16 defining the lateral faces of the profiled member, together with a horizontal branch 18 defining the upper face of the profiled member (FIG. 2).

The wiping strip 12 comprises two vertically superimposed portions, namely a lower portion 20 which constitutes the wiping strip itself, and an upper coupling portion 22. The profile of the lower portion 20 is conventional, and the latter is extended by the hollow upper portion 22 coupling it to the profiled member 10, which has a transverse cross section in the form of a U.

The parallel, vertical branches 24 and 26 of the U extend parallel to the general vertical plane in which the lower portion 20 extends, and they are joined together through a horizontal branch 27.

The spacing of the vertical branches 24 and 26, and the choice of their thicknesses, are such that the lateral faces 14 and 16 of the profiled member 10 are gripped resiliently in the hollow junction portion 22.

In order to improve the inter-engagement of the hollow portion 22 on the support 10, and to prevent it from becoming separated during operation, the inner faces of the branches 24 and 26 are provided with protruding longitudinal ribs 28, which are received in complementary longitudinal grooves 30 formed in the lateral faces 14 and 16 of the profiled member 10.

Each of the lower portions of the branches 24 and 26 has longitudinal folds 32, which together define an intermediate portion in the form of a resilient bellows 34.

The connecting bellows 34 give the wiping strip an elasticity in the vertical direction, which enables it to adapt to the curvature of the glass to be swept.

This transverse elasticity can be augmented by filling the internal chamber, having a rectangular cross section, which is defined between the profiled member 10 and the hollow coupling portion 22, with a resilient foam 35, which in particular consists of a foam of expanded polyurethane.

Figure 3:
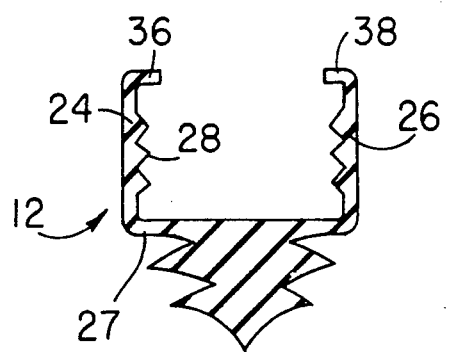
FIG. 3 is a view in transverse cross section of a different embodiment of the wiping strip.

In the embodiment shown in FIG. 3, the bellows 34 is omitted. The means for inter-engaging the strip 4 on a profiled member 10 include protruding ribs 28, and are completed by horizontal upper edges 36 and 38 which extend the upper ends of the branches 24 and 26, and which are provided so as to overlie closely, at least partially, the upper face 18 of a profiled member 10.

The profiled member 10 is connected to a driving arm (not shown), in the usual way, and the profiled member may for this purpose include a window 40 which is pressed out in its upper face 18, with two parallel side wings 39 and 41, so as to enable a pivot element to be received therein.

A windshield wiper arm in accordance with the invention is made by the following method.

The wiping strip 12 is made as a continuous extruded rubber strip, and the profiled member 10 as an extrusion of plastics material.

These long strips are then cut to form pieces of the same length, which are then assembled, without any adhesive or securing operation, by nesting one within the other.

Before assembly, the profiled member 10 has been able to be formed so that it has a predetermined spatial configuration.

This forming step may be carried out with the use of a hot mould of the required shape and profile.

In the course of this forming step, it is also possible to configure the ends of the arm.

It is also possible to form the lateral side wings for securing the driving arm, and the window 40, from the material constituting the upper face 18 of the profiled member, by means of an insert member of the hot mould such as to enable this part of the arm to be shaped.

The mould may be formed in several parts, comprising two end parts and a standard central part which can be used for all models, together with interchangeable intermediate parts of varying lengths which are selected according to the intended final length of the arm.

The whole of this method can be carried out entirely automatically, and hardly any storage of components or of intermediate elements is required.

Painting operations are avoided.

The lateral elements of the strip which flank the profiled element enclose the greater part of the latter and make the presence of the plastics material almost impossible to see.

The rubber side elements of the arm are aesthetically very pleasing, and it is possible to apply marks to them and/or to modify their surface condition.

It is also possible to use coloured plastics materials, so as to make arms in shades matched to those of the vehicle bodywork.

In accordance with a further variant which is not shown, the hollow portion 22 may be entirely closed, so as to constitute a tube into which the profiled member 10 is inserted during the assembly operation.

If necessary the profiled member may be of metal.

The inter-engagement of the wiping strip on the profiled member may be completed by total or partial adhesion, which further improves the internal sealing of the arm.

The foam which is introduced into the arm also plays a part in the securing of the two arm components together.

The profiled member may include an integral aerodynamic wing or means for attaching such a wing.

I claim:

1. A windshield wiper blade comprising:
a wiper strip including a hollow coupling portion, said coupling portion having a pair of spaced apart wall members, each of said wall members having an inside surface, each inside surface including a plurality of grooves, said wiper strip further including a wiper member extending from said coupling portion for engaging a surface to be wiped;
a support member releasably locked in the space between said coupling portion wall members, said support member having a pair of spaced apart side walls and a support wall extending between said side walls, each of said side walls engaging one of the wall members of the coupling portion and having an outside surface and an inside surface, each outside surface of each said side wall having a plurality of ribs, each of said ribs being received in one of the grooves of its associated coupling portion wall member, and
an intermediate portion having a bellows defining folds extending longitudinally, with the bellows joining the wiping element to the hollow coupling portion.

2. A windshield wiper blade according to claim 1, wherein the hollow coupling portion has a substantially U-shaped transverse cross section, the side walls of the support member being substantially enclosed by the wall members of the coupling portion of the wiping strip.

3. A windshield wiper blade according to claim 2, wherein the support member has a substantially U-shaped transverse cross section, which cooperates with the wiping strip to define an internal chamber of substantially rectangular cross section.

4. A windshield wiper blade according to claim 3, which further includes a resiliently deformable material in the internal chamber, the latter deformable material in the internal chamber, the latter being filled with said material.

5. A windshield wiper blade according to claim 4, wherein the resiliently deformable material is a foam.

6. A windshield wiper blade according to claim 1, wherein the support member is a plastic material.

7. A windshield wiper blade according to claim 1, wherein the support member and the wiping strip are pieces cut from a continuous strip.

8. A windshield wiper blade according to claim 7, wherein the wiping strip is made of extruded rubber and the support member is made of extruded plastic material.

9. A windshield wiper blade according to claim 8, wherein the support member has been preformed in a mould prior to its assembly with the wiping strip.

10. A windshield wiper blade according to claim 1 wherein the inside surface of each coupling portion wall member further includes a plurality of rib portions and wherein the outside surface of each support member side wall includes a plurality of grooves, each of the ribs of the coupling portion wall inside surfaces being received in one of the grooves in the outside surface of its associated support member side wall.

* * * * *

UNITED STATES PATENT AND TRADEMARK OFFICE
CERTIFICATE OF CORRECTION

PATENT NO.    : 5,307,536

DATED         : May 3, 1994

INVENTOR(S)   : Henri Lescher

It is certified that error appears in the above-identified patent and that said Letters Patent is hereby corrected as shown below:

Column 4, Claim 4, lines 62 and 63, delete "deformable material in the internal chamber, the latter"

Signed and Sealed this

Thirtieth Day of August, 1994

Attest:

Attesting Officer

BRUCE LEHMAN

*Commissioner of Patents and Trademarks*